United States Patent
Ihne et al.

(10) Patent No.: US 12,228,327 B2
(45) Date of Patent: Feb. 18, 2025

(54) METHOD FOR EXPLOSION-PROOF THAWING OF MEANS OF TRANSPORT OR MEANS OF TRACTION TRANSPORTING IN PARTICULAR BULK MATERIAL

(71) Applicant: AWAS FEE GMBH, Wilnsdorf (DE)

(72) Inventors: Heinz Ihne, Wilnsdorf (DE); Peter Kähmann, Bochum (DE); Vadim Loboyko, Essen (DE)

(73) Assignee: AWAS FEE GMBH, Wilnsdorf (DE)

( * ) Notice: Subject to any disclaimer, the term of this patent is extended or adjusted under 35 U.S.C. 154(b) by 426 days.

(21) Appl. No.: 17/631,222

(22) PCT Filed: Dec. 12, 2019

(86) PCT No.: PCT/EP2019/084818
§ 371 (c)(1),
(2) Date: Jan. 28, 2022

(87) PCT Pub. No.: WO2021/018409
PCT Pub. Date: Feb. 4, 2021

(65) Prior Publication Data
US 2022/0268509 A1    Aug. 25, 2022

(30) Foreign Application Priority Data
Jul. 30, 2019   (DE) .................... 10 2019 120 550.6

(51) Int. Cl.
*F25D 21/12*   (2006.01)
(52) U.S. Cl.
CPC .................. *F25D 21/125* (2013.01)

(58) Field of Classification Search
CPC ......... F25D 21/125; B60S 3/006; F26B 15/16
See application file for complete search history.

(56) References Cited

U.S. PATENT DOCUMENTS 4,104,805 A * 8/1978 Margittai ................ F26B 15/16
34/92
4,370,534 A * 1/1983 Brandon ............... F26B 25/066
43/132.1

(Continued)

FOREIGN PATENT DOCUMENTS

DE        66 843 A1    5/1969
DE      2 78 122 A1    4/1990

(Continued)

OTHER PUBLICATIONS

International Search Report (with English translation) and Written Opinion (with Machine translation) issued on Apr. 3, 2020 in corresponding International Patent Application No. PCT/EP2019/084818; 17 pages.

(Continued)

*Primary Examiner* — Marc E Norman
*Assistant Examiner* — Matthew John Moscola
(74) *Attorney, Agent, or Firm* — Maier & Maier, PLLC

(57) ABSTRACT

A method for thawing of a transport transporting bulk material includes providing water vapor, introducing water vapor into a thawing chamber. The transport transporting bulk material and to be thawed is at least partially located in the thawing chamber. Air loaded with the water vapor and having a preset dew point temperature $T_T$ is generated in the thawing chamber, and the dew point temperature $T_T$ is adapted to the transport transporting bulk material.

19 Claims, 1 Drawing Sheet

(56) References Cited

U.S. PATENT DOCUMENTS

| | | | |
|---|---|---|---|
| 4,683,870 A | 8/1987 | Björklund | |
| 2004/0261953 A1* | 12/2004 | Hart | F24F 5/0035 |
| | | | 160/80 |
| 2009/0293526 A1* | 12/2009 | Ichinomiya | F24F 3/1411 |
| | | | 62/271 |
| 2015/0101640 A1* | 4/2015 | Granstrom | B60S 3/006 |
| | | | 134/123 |
| 2019/0145688 A1* | 5/2019 | Tsuno | F25D 3/06 |
| | | | 62/129 |
| 2021/0310914 A1* | 10/2021 | Kunc | G01N 1/286 |

FOREIGN PATENT DOCUMENTS

| | | |
|---|---|---|
| EP | 0048106 A1 | 3/1982 |
| JP | 200546088 A | 2/2005 |
| JP | 2005229959 A | 9/2005 |
| RU | 2025430 C1 | 12/1994 |
| RU | 2401239 C1 | 10/2010 |
| WO | 7900331 A1 | 6/1979 |

OTHER PUBLICATIONS

First Examination Report issued on Nov. 15, 2022, in corresponding Russian Application No. 2022104486/12, 12 pages.
Examination Report issued on Mar. 28, 2022 in corresponding German Application No. 10 2019 120 550.6; 18 pages including machine generated English-language translation.

* cited by examiner

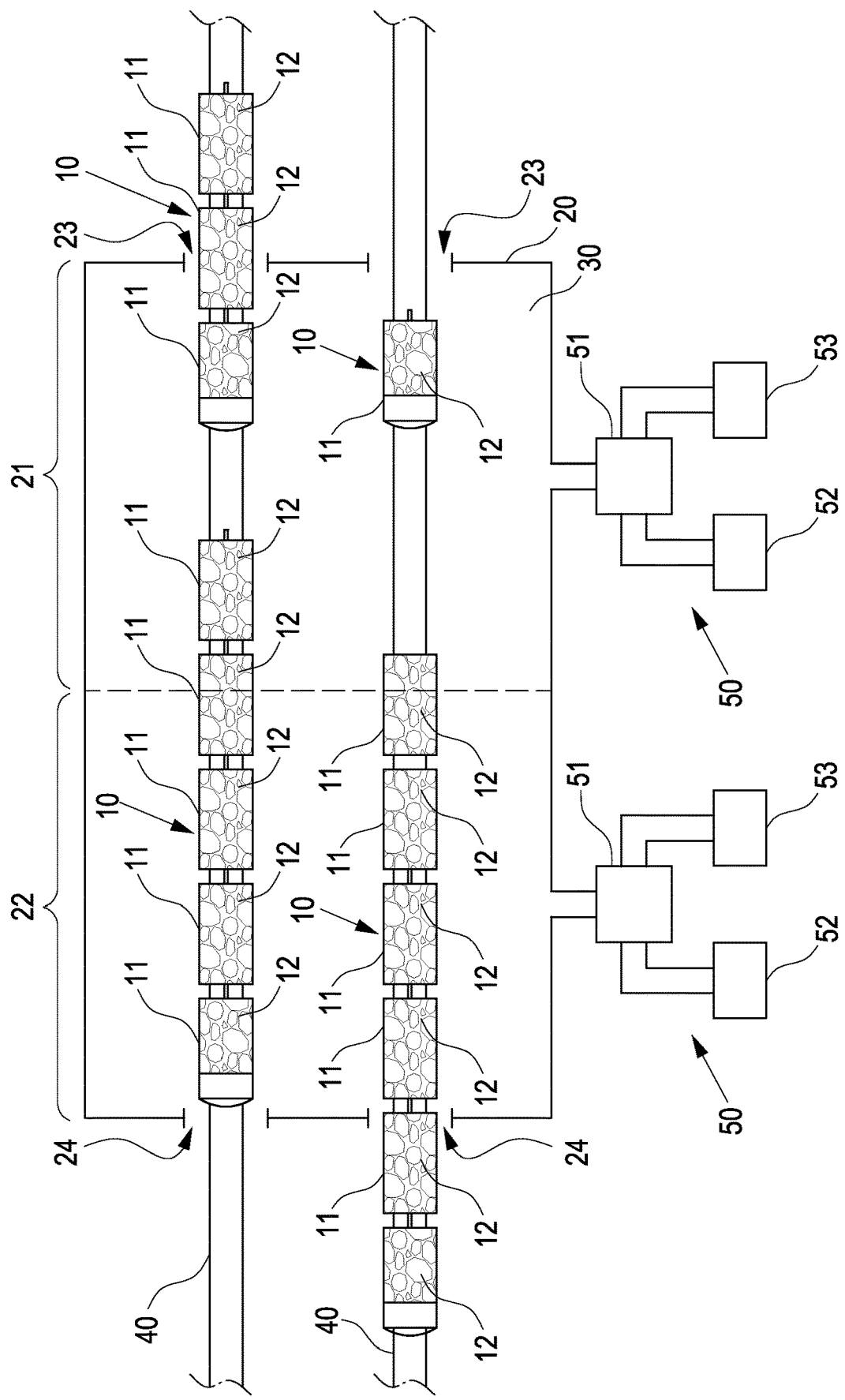

METHOD FOR EXPLOSION-PROOF THAWING OF MEANS OF TRANSPORT OR MEANS OF TRACTION TRANSPORTING IN PARTICULAR BULK MATERIAL

FIELD

The invention relates to a method for explosion-proof thawing of means of transport transporting in particular bulk material, particularly for rail-bound open bulk material wagons with frozen bulk materials.

BACKGROUND

Such methods are used during the winter months in thawing tunnels in front of wagon tipping facilities in which bulk materials are transferred automatically. At temperatures below the freezing point of water, moisture may freeze in the bulk materials such that the bulk materials adhere to the means of transport, which makes emptying difficult. In the thawing process, it must be taken into account that a plurality of bulk materials may cause dust explosions, in particular bulk materials such as hard coal, lignite, sulfur and other bulk materials causing dust.

In prior art, open infrared radiators operated with gas or electric current are often used for thawing means of transport transporting bulk material. Said radiators reach surface temperatures of over 800° C. and are thus in some cases far above the ignition limit for dust explosions. In order not to damage various attachments of the means of transport, for example the braking system, by overheating, the heat radiators usually only act on the side walls of the wagons. Furthermore, the use of gas-fired flue gas generators is known in the prior art, with the aid of which the thawing process on the underside of the means of transport is to be supported.

A uniform effective thawing performance of the entire means of transport is possible to a limited extent at best, taking into account the maximum permissible temperatures on the means of transport. In order to still thaw the bulk materials in the means of transport sufficiently so that emptying at wagon tipping facilities becomes possible, relatively long thawing times are usually required. Accordingly, the thawing tunnels, which are passed through by the means of transport transporting bulk material, are usually designed to be relatively long.

Furthermore, wagon thawing tunnels operated with hot air are known from prior art. The thawing performance of a thawing device operated only with hot air is lower than the thawing performance of thawing devices operated with infrared radiators. The swirling of the hot air further leads to a dry dust swirling, wherein the swirled dust can cause a dust explosion when it comes into contact with an appropriate ignition source, for example in the case of sparking due to static charging. Here, the thawing tunnels are also designed to be correspondingly long.

A further problem in thawing the means of transport transporting bulk material is that there is a maximum permissible temperature which the means of transport transporting bulk material may reach. The maximum permissible temperature which the means of transport may reach is regulated by law in most countries. In general, the problem may also arise that the powertrain, in particular the transmission, of locomotives or drive trains freezes or ices up.

SUMMARY

The object of the present invention is to provide a method enabling a safe and efficient thawing of means of transport and/or locomotives, drive trains or other means of traction transporting in particular bulk material.

According to the invention, the method for thawing of means of transport and/or means of traction, e.g. locomotives, drive trains or other means of traction, transporting in particular bulk material comprises the provision of water vapor and the introduction of water vapor into a thawing chamber, wherein the means of transport and/or the means of traction to be thawed is at least partially located in the thawing chamber, wherein air (30) loaded with the water vapor and having a preset dew point temperature $T_T$ is generated in the thawing chamber (20), wherein the dew point temperature $T_T$ is adapted to the means of transport (10) or the means of traction transporting bulk material. The means of transport and/or the means of traction transporting bulk material is thus subjected to a thawing process.

It may be provided that the water vapor is mixed with air and introduced into the thawing chamber (20) together with the air.

This may involve a preconditioning in which steam and air are mixed so that the mixture of water vapor and air thus provided has a preset dew point temperature $T_{T2}$. This can correspond to the dew point temperature $T_T$ in stationary operation. For example, preconditioning can be accomplished by combining a steam generator with an air intake device that provides the required (dry) air or water vapor in a conditioning device. The mixture of water vapor and air can thus be preconditioned in a desired manner before being introduced into the thawing chamber.

The thawing chamber is the chamber in which the thawing of a means of transport or a means of traction transporting bulk material substantially takes place. The thawing chamber can be formed, for example, by a tunnel or a hall in which means of transport or means of traction transporting bulk material can be parked and/or which can be passed through by means of transport or means of traction transporting bulk material. The thawing process begins for the respective means of transport or means of traction transporting bulk material when they enter the thawing room and ends when they leave the thawing room. Thus, the thawing process includes a period of time for each means of transport or means of traction transporting bulk material, in which period of time the respective means of transport or means of traction transporting bulk material is at least partially located in the thawing chamber.

The method according to the invention makes use of the enthalpy of vaporization or enthalpy of condensation of water. The enthalpy of vaporization of a substance generally corresponds to the amount of energy required to convert the substance from the liquid to the gaseous state of aggregation. Specifically, the enthalpy of vaporization only refers to the amount of energy required for changing the state of aggregation and not for increasing the temperature. This is therefore latent heat. Compared to many other liquids, water has a relatively high specific enthalpy of vaporization. This is mainly due to the relatively strong attractive forces between the strongly polar water molecules. When gaseous water condenses on the surfaces of a means of transport transporting bulk material, the enthalpy of vaporization is released abruptly in the form of heat and supplied to the surfaces where the condensation takes place. The heat transfer of the air loaded with water vapor or of the condensate to the surfaces of the means of transport transporting bulk material is relatively good compared to the heat transfer of only air, for example.

The dew point temperature $T_T$ of the air loaded with water vapor is the temperature that must be fallen below at constant air pressure for water vapor to separate as condensate. In other words: As long as a body exposed to air loaded with water vapor and having a dew point temperature $T_T$ has a temperature that is below the dew point temperature $T_T$, condensate may deposit on said body, with the latent heat in the condensing water vapor substantially transferring to the body. The dew point temperature $T_T$ depends on the water vapor partial pressure of the air loaded with water vapor, wherein the dew point temperature $T_T$ of the air loaded with water is the higher, the more water vapor is contained in the air, i.e. the higher the water vapor partial pressure.

The thawing process can be controlled by adapting the dew point temperature $T_T$ to the means of transport or means or traction, thus particularly influencing how quickly the thawing process takes place and up to which temperature of the means of transport or the means of traction transporting bulk material water vapor is deposited as condensate on the surfaces of the means of transport and heats the latter. If the means of transport or means of traction transporting bulk material reaches the preset dew point temperature $T_T$ during the thawing process, there is essentially no further deposition of water vapor in the form of condensate on the surfaces of the means of transport or means of traction to be thawed. Heating the means of transport or means of traction transporting bulk material to a temperature above the preset dew point temperature $T_T$ can thus be greatly slowed down or suppressed in an advantageous manner A suitable selection of the dew point temperature $T_T$, which is based, for example, on a maximum permissible temperature $T_{max}$ of the means of transport or the means of traction transporting bulk material, ensures that the means of transport or the means of traction transporting bulk material does not heat up into undesirable or impermissible temperature ranges. The risk of a dust explosion can also be minimized.

By using the method according to the invention, a safe and energy-efficient possibility is provided to thaw means of transport and/or means of traction transporting bulk material. Both the duration of the thawing process and the temperature of the means of transport or means of traction transporting bulk material at the end of the thawing process can be influenced in an advantageous manner by the method according to the invention. The method thus offers a high level of safety against dust explosions due to the use of air loaded with water vapor.

Compared to the method based on infrared radiators, the method according to the invention also has the advantage of largely uniform heating of the means of transport or means of traction transporting bulk material, in particular due to the fact that the deposition of the condensate and the release of the latent heat during the thawing process takes place automatically first at the coldest points of the means of transport or means of traction transporting bulk material. Furthermore, areas of a means of transport or means of traction transporting bulk material that are difficult or impossible to reach, such as the underside of the means of transport or the means of traction, can be reached in this way.

The water vapor or the mixture of water vapor and air can also be supplied from the underside of the means of transport or the means of traction transporting bulk material, wherein the water vapor or the mixture of water vapor and air rises and creeps quasi automatically upward to the further cold points of the means of transport or means of traction transporting bulk material, and heats these.

Moreover, the dew point temperature $T_T$ of the air loaded with water vapor in the thawing chamber can be adapted in an advantageous manner to the object to be thawed or to its properties. A property on the basis of which the dew point temperature $T_T$ can be preset in an advantageous manner is the temperature $T_{TM}$ of the means of transport or the means of traction transporting bulk material at the beginning of the thawing process. The temperature $T_T$ M can be measured, for example. Thus, for example, when the temperature $T_{TM}$ is very low at the beginning of the thawing process, a higher dew point temperature $T_T$ can be selected in order to accelerate the thawing process. In particular at the beginning of the thawing process, this can be implemented without any problems, since at the beginning of the thawing process the temperature $T_{TM}$ of the means of transport or the means of traction transporting bulk material is usually still far below a maximum permissible temperature $T_{max}$.

Preferably, it is provided that the dew point temperature $T_T$ of the air loaded with water vapor approximately corresponds to a maximum permissible temperature $T_{max}$ of the means of transport, preferably 50° C.

In many countries of the world, a maximum permissible temperature $T_{max}$ is specified for means of transport and/or means of traction transporting bulk material, in particular for rail-bound means of transport, which temperature the means of transport and/or the bulk material and/or the means of traction may reach at maximum. By selecting a dew point temperature $T_T$ of the air loaded with water vapor that at least approximately corresponds to the maximum permissible temperature $T_{max}$ valid in the respective country, the legal requirements can be advantageously met.

According to the invention, it may also be provided that the dew point temperature $T_T$ of the air loaded with water vapor is between 50° C. and 80° C., preferably between 50° C. and 70° C., preferably between 50° C. and 60° C. The air pressure in the thawing chamber corresponds to the ambient pressure.

A suitable selection of the dew point temperature $T_T$ can advantageously influence the duration of the thawing process. Furthermore, the thawing process can be selected depending on the type of bulk material transported and/or depending on a maximum permissible maximum temperature $T_{max}$ of the means of transport or the means of traction. Depending on the temperature $T_{TM}$ of the means of transport or the means of traction transporting bulk material and to be thawed, the dew point temperature $T_T$ of the air loaded with water vapor can, if required, be selected comparatively high, for example the same or even somewhat higher, for example up to 10 K above the maximum permissible maximum temperature $T_{max}$, in order to realize sufficient thawing performance even at very low temperatures.

Preferably, it may also be provided that the air loaded with water vapor has a relative humidity of at least 80%, preferably at least 90%, preferably at least 95%.

It may also be provided that the temperature of the air $T_L$ loaded with water vapor fulfills the condition $T_L \leq (T_T+20 \text{ K})$, preferably the condition $T_L \leq (T_T+10 \text{ K})$.

In the non-saturated state of the air loaded with water vapor, the temperature of the air $T_L$ loaded with water vapor is generally higher than the dew point temperature $T_T$. In order to avoid temperatures of the means of transport or the bulk material that are too high or possibly even not permitted, it is possible to specify, in the case of non-saturated air loaded with water vapor, how much the temperature of the air $T_L$ loaded with water vapor may be above the dew point temperature $T_T$. In this way, in the event of a backlog or a malfunction during a thawing process, it can be avoided that means of transport or means of traction transporting bulk material assume a temperature far above the dew point temperature and are heated excessively.

Moreover, it may be provided that the air loaded with water vapor is saturated, preferably oversaturated.

The higher the relative humidity of the air loaded with water vapor, the closer the temperature of the air $T_L$ loaded with water vapor is to the dew point temperature of the air $T_T$ loaded with water vapor. At a relative humidity of 100%, i.e. saturated air loaded with water vapor, $T_L=T_T$ applies (approximately). The use of substantially saturated air loaded with water vapor thus enables in an advantageous manner, by specifying the dew point temperature $T_T$, to at the same time specify the maximum temperature that can be reached in the process by the means of transport or means of traction transporting bulk material. In other words: When using saturated air loaded with water vapor, the temperature in the thawing chamber corresponds to the dew point temperature $T_T$ so that no further heating of the means of transport or means of traction transporting bulk material takes place from the time at which the means of transport or means of traction transporting bulk material reach the dew point temperature. A state of equilibrium is reached in which no component of the means of transport or the means of traction transporting bulk material is heated above the dew point temperature $T_T$.

Furthermore, it may be provided that the dew point temperature $T_T$ is adjusted at the beginning of a thawing process to the temperature $T_{TM}$ of the means of transport or means of traction transporting bulk material. Preferably, the temperature $T_{TM}$ is measured, preferably continuously, by means of a measuring device. In this way, the temperature $T_{TM}$ can also be monitored.

The dew point temperature $T_T$ can be adjusted via a control device, wherein the dew point temperature $T_T$ is preferably specified as a function of the temperature of the means of transport $T_{TM}$ transporting bulk material at the beginning of the thawing process.

According to the invention, it may also be provided that the dew point temperature $T_T$ of the air loaded with water vapor is adjusted during a thawing process at specific times and/or in specific areas of the thawing chamber to the temperature $T_{TM}$ then present of the means of transport or means of traction transporting bulk material.

By adjusting the dew point temperature during the thawing process, it is advantageously possible to influence the thawing process. In particular, this can realize a higher efficiency of the thawing process, for example by reducing the thawing time corresponding to the duration of the thawing process.

Furthermore, it may be provided that the dew point temperature $T_T$ of the air loaded with water vapor is continuously adjusted during a thawing process to the temperature $T_{TM}$ of the means of transport or means of traction transporting bulk material.

A continuous adjustment of the dew point temperature $T_T$ of the air loaded with water vapor can further improve the efficiency of the thawing process, in particular the thawing time. For example, the continuous adjustment of the dew point temperature $T_T$ can be performed in real time on the basis of temperatures $T_{TM}$ of the means of transport or means of traction transporting bulk material measured by means of measuring devices. In particular, the dew point temperature can be selected relatively high at the beginning of the thawing process and reduced at the end of the thawing process in order to meet the aspects of energy efficiency while at the same time complying with any legally prescribed maximum temperatures for means of transport or means of traction. In other words, the dew point temperature $T_T$ preferably decreases from the beginning of the thawing process or from one end of the thawing chamber to the end of the thawing process or to the other end of the thawing chamber.

Furthermore, it may be provided that the dew point temperature $T_T$ of the air loaded with water vapor is adjusted by controlling the water vapor partial pressure of the air loaded with water vapor.

Preferably, it is provided that the water vapor partial pressure of the air loaded with water vapor is reduced as soon as the temperature $T_{TM}$ of the means of transport or means of traction transporting bulk material reaches a predefined threshold temperature $T_{Schwelle}$, preferably as soon as the condition $|T_{Schwelle}-T_{TM}|<5$ K is fulfilled.

It may also be provided that the predefined threshold temperature $T_{Schwelle}$ at least approximately corresponds to a maximum permissible temperature $T_{max}$ of the means of transport or means of traction transporting bulk material, preferably 50° C.

By reducing the water vapor partial pressure of the air loaded with water vapor, the dew point temperature $T_T$ can be efficiently reduced in order to avoid excessive heating of the means of transport or means of traction transporting bulk material. By specifying a predefined threshold temperature $T_{Schwelle}$, which is preferably based on the legally prescribed maximum permissible temperature of the means of transport or means of traction $T_{max}$, it can thus be ensured that the means of transport and/or means of transport or the bulk material does not heat up into an undesirable temperature range, thus reducing the risk of a dust explosion.

It may be provided that the reduction of the water vapor partial pressure of the air loaded with water vapor is performed by means of continuously variable steam generators.

According to the invention, it may also be provided that the temperature $T_{TM}$ of the means of transport or the means of traction transporting bulk material is monitored, preferably during the entire thawing process.

The temperature or temperatures at the means of transport or means of traction transporting bulk material can be monitored by means of a measuring device, preferably by means of temperature sensors. Alternatively, estimation methods based on thermodynamic models can be used to approximately determine the temperature. By monitoring the temperature of the means of transport or means of traction transporting bulk material, a measurand is recorded in an advantageous manner, which measurand can be used for a suitable adjustment of the dew point temperature.

Preferably, it is provided that the means of transport transporting bulk material is at least partially wetted with a wetting agent before water vapor or the mixture of water vapor and air is introduced into the thawing chamber.

Preferably, it is provided that the liquid water formed on the means of transport or on the means of traction transporting bulk material is blown off at the end of the thawing process and/or during the thawing process.

By wetting the means of transport with a wetting agent, the condensate separated from the air loaded with water vapor can flow off in an advantageous manner Blowing off the condensate, preferably by means of blow-off devices, can advantageously accelerate and support the removal of the condensate from the means of transport. This ensures that refreezing of the means of transport after completion of the thawing process is suppressed.

Furthermore, it may be provided that the thawing process is performed in at least two phases, wherein the dew point temperature $T_T$ of the air loaded with water vapor can be controlled separately in each phase.

The phases can be temporal and/or spatial phases, in particular depending on the design of the thawing chamber. In a thawing process that takes place in several purely temporally different phases, the thawing process substantially takes place while the means of transport transporting bulk material is stationary in the thawing chamber. In the various temporal phases, particularly the dew point temperature $T_T$ can be changed, for example gradually reduced.

Preferably, it is provided that the at least two phases of the thawing process take place in different spatial sections of the thawing chamber, with the means of transport transporting bulk material or the means of traction being moved along the sections of the thawing chamber.

In a thawing process that takes place in several spatially different phases, the thawing chamber can be divided into spatial sections, for example, which are driven through by a means of transport or means of traction transporting bulk material. In particular, a different dew point temperature $T_T$ may prevail in each of the different spatial sections. For example, the dew point temperature $T_T$ may become lower section by section.

Due to the phased design of the thawing process, the thawing time, which corresponds to the duration of the thawing process, can be reduced in an advantageous manner, since at the beginning of the thawing process a comparatively high dew point temperature $T_T$ of the air loaded with water vapor can be selected, which is, for example, significantly above the maximum permissible maximum temperature $T_{max}$, for example 30 K above the maximum permissible maximum temperature $T_{max}$, in order to achieve an initial thawing of the means of transport or means of traction transporting bulk material as quickly as possible, while at the end of the thawing process a dew point temperature $T_T$ can be selected which, according to the method according to the invention described above, corresponds at least approximately to a maximum permissible maximum temperature $T_{max}$, which the means of transport or means of traction transporting bulk material may reach. Thus, in particular, efficient thawing can be realized while at the same time complying with legal requirements.

Furthermore, it may be provided that several means of transport transporting bulk material and/or the means of traction are sequentially or simultaneously moved through the thawing chamber.

Preferably, it is provided that the speed at which the means of transport or means of traction transporting bulk material are moved through the thawing chamber is preset, preferably adapted to a defined dwell time in the thawing chamber.

BRIEF DESCRIPTION OF THE FIGURE

In the following, the method according to the invention in explained in more detail with reference to the FIGURE.

DETAILED DESCRIPTION

The FIGURE of the invention shows an exemplary embodiment of the method according to the invention with two rail sections 40 on which the means of transport 10 transporting bulk material drives. The means of transport 10 transporting bulk material comprise one or several means of transport 11 with which respectively one bulk material 12 can be transported.

The means of transport 10 transporting bulk material drive through a thawing chamber 20 having a first section 21 and a second section 22, the sections 21, 22 being spatial sections.

The thawing chamber 20 comprises for each rail section 40 an entry opening 23 and an exit opening 24 through which the means of transport 10 transporting bulk material can drive into or drive out of the thawing chamber 20. The entry and exit openings 23, 24 can be provided with air locks which are not illustrated. For example, said air locks can have vertically extending, parallel strips of flexible material, preferably a rubber material, which are arranged at opening edges of the entry and exit opening 23, 24 and form an opening adapted to the contour of the means of transport 10. This can increase an inflow resistance of cold air from the outside into the thawing chamber 20 and prevent energy losses. Moreover, fans may be arranged in the air locks to control the air pressure in the thawing chamber 20.

The thawing chamber contains air 30 loaded with water vapor and having a preset dew point temperature $T_T$, wherein the dew point temperature $T_T$ may differ in the respective sections 21, 22. For example, the first section 21 of the thawing chamber 20 may have a higher dew point temperature than the second section 22 of the thawing chamber 20. For this purpose, each section 21, 22 of the thawing chamber comprises a separate conditioning device 50 with a mixing device 51, a steam generator 52 and an air intake device 53. The steam generators 52 are preferably continuously variable and provide water vapor with predefinable, preferably preset thermodynamic properties. The steam generated in the steam generators is supplied by means of supply lines of the respective mixing chamber 51. The air intake device 53 is used to intake ambient air and supply it to the mixing chamber by means of supply lines. The mixing chambers 51 mix the water vapor from the respective steam generator 52 and the air from the respective air intake device 53 and provide a preconditioned mixture of water vapor and air having a preset dew point temperature. The mixture of water vapor and air is introduced into the respective section 21, 22 of the thawing chamber 20 by means of supply lines.

According to the exemplary embodiment of the only FIGURE, a thawing process may proceed as follows: The starting point is a means of transport 10 transporting bulk material and travelling on a rail 40, where icing is present due to low ambient temperatures. The thawing process for the means of transport 10 transporting bulk material begins with its entry into the thawing chamber 20 through the respective entry opening 23 of the thawing chamber. The means of transport 10 transporting bulk material first drives through the first section 21 of the thawing chamber 20 and then through the second section 22 of the thawing chamber 20 and, as it drives through the section, is thawed by means of latent heat released during condensation processes, depending on the respective prevailing dew point temperature $T_T$. The thawing process ends with the complete exit of the means of transport 10 transporting bulk material from the thawing chamber 20 through the respective exit opening 24 of the thawing chamber 20. After the thawing process has been completed, the means of transport transporting bulk material can be provided, for example, to a wagon tipping facility, which is not illustrated, where the bulk material 12 located in the respective means of transport 11 of the means of transport 10 transporting bulk material can be reloaded.

The invention claimed is:

1. A method for thawing of means of transport and/or means of traction transporting bulk material, comprising:
   providing water vapor;
   introducing water vapor into a thawing chamber, wherein the means of transport and/or means of traction transporting bulk material and to be thawed is at least partially located in the thawing chamber, air loaded with the water vapor and having a preset dew point temperature $T_T$ is generated in the thawing chamber, the dew point temperature $T_T$ is adapted to the means of transport and/or means of traction transporting bulk material, and the dew point temperature $T_T$ of the air loaded with water vapor is adjusted to a temperature $T_{TM}$ of the means of transport or the means of traction transporting bulk material.

2. The method according to claim 1, wherein the water vapor is mixed with air and introduced into the thawing chamber together with the air.

3. The method according to claim 1, wherein the dew point temperature $T_T$ of the air loaded with water vapor at least approximately corresponds to a maximum permissible temperature $T_{max}$ of the at least one means of transport or the means of traction transporting bulk material.

4. The method according to claim 1, wherein the dew point temperature $T_T$ of the air loaded with water vapor is between 50° C. and 80° C.

5. The method according to claim 1, wherein the air loaded with water vapor has a relative humidity of at least 80%.

6. The method according to claim 5, wherein the air loaded with water vapor has a temperature $T_L$ which fulfills the condition $T_L \leq (T_T + 20\ K)$.

7. The method according to claim 1, wherein the air loaded with water vapor is saturated.

8. The method according to claim 1, further comprising: adjusting the dew point temperature $T_T$ of the air loaded with water vapor by controlling the water vapor partial pressure of the air loaded with water vapor.

9. The method according to claim 8, further comprising: reducing the water vapor partial pressure of the air loaded with water vapor as soon as the temperature $T_{TM}$ of the means of transport or means of traction transporting bulk material reaches a predefined threshold temperature $T_{Schwelle}$.

10. The method according to claim 9, wherein the predefined threshold temperature $T_{Schwelle}$ at least approximately corresponds to a maximum permissible temperature $T_{max}$ of the means of transport or the means of traction transporting bulk material.

11. The method according to claim 1, further comprising: monitoring the temperature $T_{TM}$ of the means of transport or the means of traction transporting bulk material.

12. The method according to claim 1, wherein the means of transport and/or the means of traction transporting bulk material is at least partially wetted with a wetting agent before the air loaded with water vapor is introduced into the thawing chamber.

13. The method according to claim 1, further comprising: blowing off the liquid water formed on the means of transport or on the means of traction transporting bulk material at the end of the thawing process and/or during the thawing process.

14. The method according to claim 1, further comprising: performing the thawing process in at least two phases, wherein the dew point temperature $T_T$ of the air loaded with water vapor can be controlled separately in each phase.

15. The method according to claim 14, wherein the at least two phases of the thawing process take place in different spatial sections of the thawing chamber, with the means of transport transporting bulk material or the means of traction being moved along the sections of the thawing chamber.

16. The method according claim 1, wherein several means of transport and/or means of traction transporting bulk material and/or at least one means of transport transporting bulk material and at least one means of traction are sequentially or simultaneously moved through the thawing chamber.

17. The method according to claim 15, wherein the speed at which the means of transport and/or the means of traction transporting bulk material and/or the at least one means of transport transporting bulk material and the at least one means of traction are moved through the thawing chamber is preset.

18. The method according to claim 8, further comprising: reducing the water vapor partial pressure of the air loaded with water vapor as soon as the temperature $T_{TM}$ of the means of transport or means of traction transporting bulk material as soon as $T_{Schwelle} - T_{TM} < 5\ K$ is fulfilled.

19. The method according to claim 9, wherein the predefined threshold temperature $T_{Schwelle}$ is 50° C.

* * * * *